US006415066B1

United States Patent
Harpin et al.

(10) Patent No.: US 6,415,066 B1
(45) Date of Patent: Jul. 2, 2002

(54) THERMALLY ISOLATED SILICON LAYER

(75) Inventors: Arnold Peter Roscoe Harpin, Oxford; Andrew George Rickman, Marlborough; Jolyon Richard Tidmarsh, Oxford, all of (GB)

(73) Assignee: Bookham Technology PLC, Abindon (GB)

( * ) Notice: Subject to any disclaimer, the term of this patent is extended or adjusted under 35 U.S.C. 154(b) by 0 days.

(21) Appl. No.: 09/057,641

(22) Filed: Apr. 9, 1998

(30) Foreign Application Priority Data

Oct. 16, 1997 (GB) ................................. 9721818

(51) Int. Cl.[7] ................................................. G02B 6/12
(52) U.S. Cl. .................................... 385/14; 385/130
(58) Field of Search ........................... 385/14, 129, 130

(56) References Cited

U.S. PATENT DOCUMENTS

| | | | | |
|---|---|---|---|---|
| 4,781,424 A | * | 11/1988 | Kawachi et al. | 385/132 |
| 5,074,630 A | | 12/1991 | Rodino et al. | 385/14 |
| 5,173,956 A | | 12/1992 | Hayes | 385/16 |
| 5,217,568 A | * | 6/1993 | Tessier et al. | 216/99 |
| 5,418,868 A | * | 5/1995 | Cohen et al. | 385/16 |
| 5,420,688 A | * | 5/1995 | Farah | 250/227.27 |
| 5,513,285 A | | 4/1996 | Kawashima et al. | 385/16 |
| 5,559,912 A | * | 9/1996 | Agahi et al. | 385/42 |
| 5,727,099 A | * | 3/1998 | Harman | 385/52 |
| 5,783,805 A | * | 7/1998 | Katzmann | 219/494 |
| 5,787,214 A | * | 7/1998 | Harpin et al. | 385/49 |
| 5,838,870 A | * | 11/1998 | Soref | 385/131 |

FOREIGN PATENT DOCUMENTS

| | | |
|---|---|---|
| EP | 62-213288 | 9/1987 |
| EP | 255270 | 2/1988 |
| EP | 1-158413 | 6/1989 |
| EP | 0837352 A2 * | 4/1998 |
| GB | 2170606 | 8/1986 |
| WO | WO 96/11516 | 4/1996 |
| WO | WO 97/42534 | 11/1997 |

OTHER PUBLICATIONS

Fischer et al. "Singlemode optical switches based on SOI waveguides with large cross–section", Electronics Letters vol. 30 No. 5, pp. 406–408, Mar. 1994.*

Sugita, et al.; Bridge–Suspended Silica–Waveguide Thermo–Optic Phase Shifter and Its Application to Mach–Zehnder Type Optical Switch; Transactions of the IEICE; pp. 105–109 Jan. 1990.

Wu and Franklin; Integrated Optical Sensors Using Micromechanical Bridges and Cantilevers; Integrated Optics and Microstructures; pp. 83–89 1992 (No Month).

* cited by examiner

Primary Examiner—Brian Healy
Assistant Examiner—Michael J Stahl
(74) Attorney, Agent, or Firm—Roberts, Abokhair & Mardula, LLC

(57) ABSTRACT

An integrated optical circuit is formed in a silicon layer and supported on a substrate, and a portion of the silicon layer is substantially thermally isolated from the substrate by extending over a recess in the substrate, e.g. in the form of a bridge. Temperature control means are provided to control the temperature of the portion of the silicon layer or of a device provided thereon. A thermal expansion gap may be provided in the portion to accommodate thermal expansion of the portion relative to the substrate.

19 Claims, 2 Drawing Sheets

THERMALLY ISOLATED SILICON LAYER

RELATIONSHIP TO OTHER APPLICATIONS

The present application claims priority under 35 USC 119 from Great Britain application No. GB9721818.4, entitled THERMALLY ISOLATED SILICON LAYER" filed Oct. 16, 1997. The disclosures of the referenced application is hereby incorporated herein by reference.

FIELD OF THE INVENTION

This invention relates to an integrated optical circuit formed in a silicon layer and supported on a substrate with at least a portion of the silicon layer being substantially thermally isolated from the substrate.

BACKGROUND OF THE INVENTION

Temperature control of integrated optical devices, particularly silicon-on-insulator (SOI) waveguides, is desirable in order to adjust the refractive index of the device (the refractive index of silicon increases by a factor of $2 \times 10^{-4}$ per degree C, which is a relatively large change compared to other optical materials).

Prior art such as EP-A-0255270 proposes the use of a recess in a silicon substrate in order to thermally isolate a silica waveguide extending there over to avoid thermal stresses in the waveguide due to the different thermal expansion coefficients of silicon and silica. This prior art also discloses forming the waveguide as a cantilever structure to provide an on-off switch activated by displacement of the cantilevered waveguide.

SUMMARY OF THE INVENTION

It is therefore an object of the present invention to provide an integrated optical circuit formed in a silicon layer and supported on a substrate.

It is a further object of the present invention to substantially thermally isolate a portion of the silicon layer from the substrate by extending the silicon layer over a recess in the substrate.

It is a further object of the present invention to provide a temperature control means to control the temperature of the portion of the silicon layer or of a device provided thereon.

Preferred and optional features of the invention will be apparent from the subsidiary claims of the specification.

The invention will now be further described, merely by way of example, with reference to the accompanying drawings, in which:

BRIEF DESCRIPTION OF THE INVENTION

DETAILED DESCRIPTION OF THE INVENTION

The integrated optical circuit described herein is based on a silicon-on-insulator (SOI) chip. A process for forming this type of chip is described in a paper entitled "Reduced defect density in silicon-on-insulator structures formed by oxygen implantation in two steps" by J. Morgail et al. Appl. Phys. Lett., 54, p526, 1989, which is herein incorporated by reference in its entirety. Morgail describes a process for forming a Very Large Scale Integrated (VLSI) silicon-on-insulator wafer. The silicon layer of such a wafer is then increased, e.g. by epitaxial growth, to make it suitable for forming the basis of the integrated interferometer described herein. SOI chips can also be formed in other ways.

Figure 1:
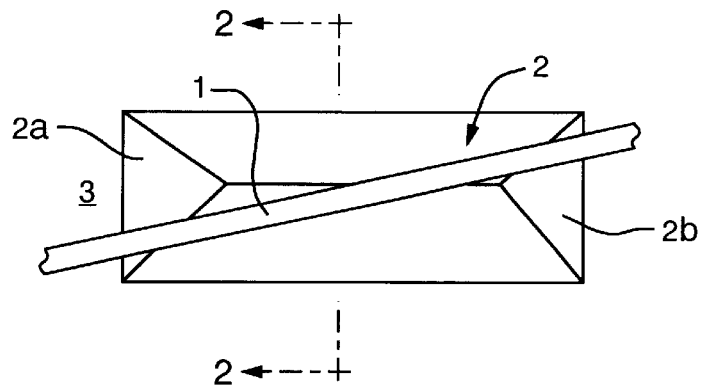
FIG. 1 shows a plan view of a silicon-on-insulator waveguide extending across a recess in a substrate according to a first embodiment of the invention.

FIG. 1 shows a silicon-on-insulator (SOI) waveguide 1 extending across a recess 2 in a silicon substrate 3 in the form of a bridge. The recess is in the form of a V-groove etched in the substrate, the ends of the V-groove comprising sloping faces 2A and 2B due to the manner in which the V-groove is etched. The SOI waveguide 1 extends obliquely across the V-groove and forms part of an integrated optical circuit (not shown) such as a Mach-Zehnder type optical switch.

Figure 2:
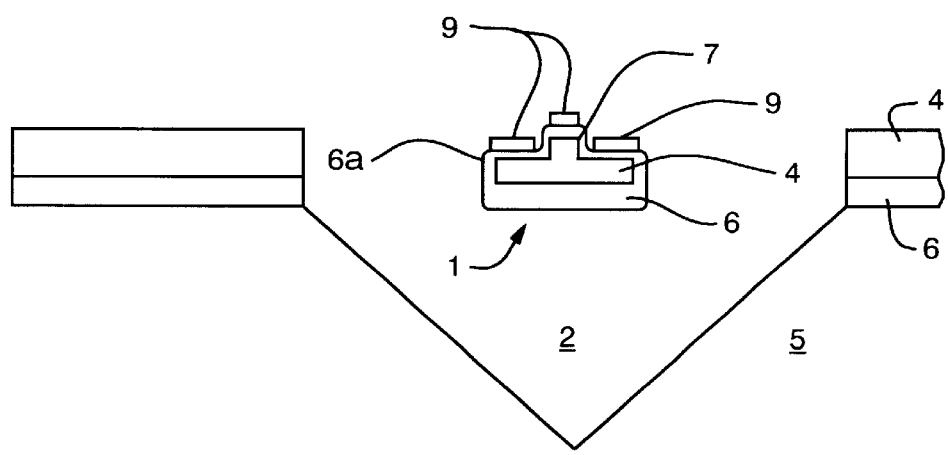
FIG. 2 shows a cross-sectional view taken on line a—a of FIG. 1.

As shown in FIG. 2, the device is formed on an SOI chip which comprises an upper layer of silicon 4 separated from a silicon substrate 5 by an insulator layer 6, typically formed of silicon dioxide. Further details of this form of waveguide are given in a paper entitled "Low Loss Single Mode Optical Waveguides with Large Cross-Section in Silicon-on-Insulator" by J. Schmidtchen et al in Electronic Letters, 27, p1486, 1991 and in PCT patent specification no. WO95/08787, which are herein incorporated by reference in their entirety.

The SOI waveguide 1 extending across the V-groove comprises a rib waveguide 7 formed in the silicon layer 4 supported by the insulator layer 6 of silicon dioxide. FIG. 2 also shows an oxide coating 6A which is formed over the rib waveguide 7 and adjacent slabs of silicon layers 4. A portion of the SOI waveguide I is substantially thermally isolated from the silicon substrate 5 as a portion of the SOI waveguide 1 extends across a region from which areas of the substrate adjacent and beneath the SOI waveguide 1 have been removed during the formation of the V-groove. The length of the recess 2 depends on the application. Typically, the recess 2 may be between 50 and 1000 microns in length.

The formation of an SOI waveguide 1 extending over a V-groove is also described in the applicant' co-pending application no. PCT/GB96/01608 publication no. WO97/42534) which describes a waveguide overhanging the end of a V-groove to facilitate butt coupling with an optical fibre positioned in the V-groove. The applicants' co-pending application no PCT/GB96/01608 (publication no. WO97/42534) is hereby incorporated by reference in its entirety.

The rib waveguide 7 is typically 4–13 microns wide and 4–13 microns deep (measured from the oxide layer 6A) and the oxide layer 6A typically has a thickness of around 0.4 microns so the overall thickness of the suspended waveguide is around 5–14 microns. Although the width of the rib waveguide 7 is typically 4–13 microns, the slab waveguide (comprised of the silicon layer 4) on either side thereof as well as the underlying oxide layer 6A preferably have a greater width, e.g. of 20–40 microns, to increase the strength of the suspended waveguide.

The device shown in FIGS. 1 and 2 is also provided with temperature control means, e.g. in the form of a metal coating or coatings 9, typically of aluminum, applied over the SOI waveguide or a portion of the SOI waveguide 1. As shown in FIG. 2, the coating 9 may be deposited as one or more conductive strips on the slab on either side of the rib waveguide 7 and/or on the rib waveguide 7. The conductive strips can be heated by passing a current therethrough to heat the SOI waveguide 1. Due to the thermal isolation of the SOI waveguide 1, very little power is required to heat the SOI waveguide 1, e.g. a few micro Watts, and the temperature of the SOI waveguide 1 can be increased very quickly, e.g. at a rate of less than a millisecond/degree C.

Other forms of temperature control means may be provided, e.g. conductive tracks formed in the slab waveguide by doping regions of the silicon layer 4.

By providing the waveguide in a substantially thermally isolated portion of the silicon layer 4, the need to heat large areas of the chip, which would consume considerably more power and be more difficult to control, is avoided.

Figure 5:
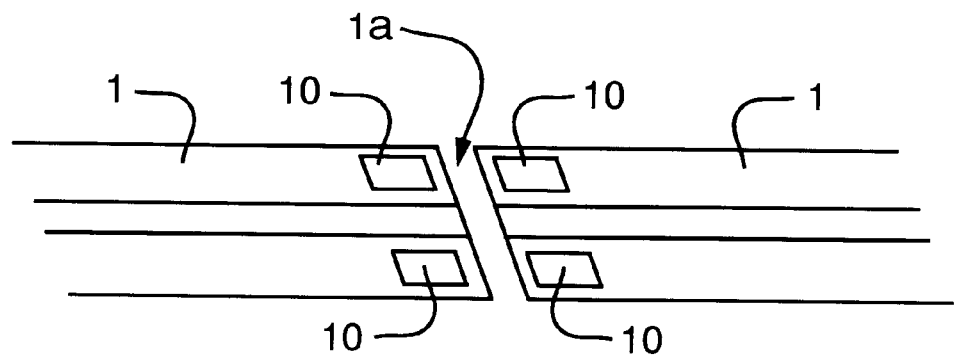
FIG. 5 shows an enlarged view of part of the device of FIG. 3.

The temperature of the SOI waveguide 1 can be monitored by suitable temperature sensing means, e.g. one or more pn junctions formed across the SOI waveguide 1 or other part of the thermally isolated portion of the silicon layer 4 of FIG 2. FIG. 5 shows pn junctions formed across the waveguide by means of p-doped and n-doped regions 10 formed in the silicon layer on either side of the rib waveguide 7.

Other forms of temperature control means and temperature monitoring means may be used for heating and monitoring the temperature of the SOI waveguide 1 or selected parts of the SOI waveguide 1.

Figure 3:
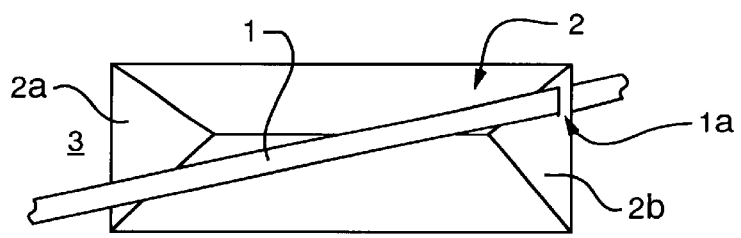
FIG. 3 is a similar view to FIG. 1 and shows a second embodiment of the device.

Due to the relatively high thermal expansion co-efficient of silicon (approximately $2 \times 10^{-6}$/degree C.) it may, in some circumstances, be desirable to accommodate thermal expansion of the thermally isolated portion of the silicon layer 4 extending across the recess 2 by provision of a thermal expansion gap 1A therein. FIG. 3 shows an embodiment in which a gap 1A is provided in the SOI waveguide 1 extending across the recess 2. The gap 1A may be provided at any position along the SOI waveguide 1, but for ease of fabrication it is preferably provided near or at one end of the SOI waveguide 1 as shown in FIG. 3. The gap 1A should be of sufficient size to accommodate the maximum expected thermal expansion of the waveguide but will typically need to be less than one micron wide. However, depending on the fabrication procedure used, it may in practice, be larger than required. A gap of a few microns width will have negligible effect on the transmission of light along the rib waveguide 7.

The ends of the SOI waveguide 1 on each side of the gap 1A are preferably provided with an anti-reflective (AR) coating to reduce Fresnel losses to negligible levels and the facets at the ends of the waveguides on each side of the gap 1A are preferably angled relative to the perpendicular to the length of the waveguide to reduce any remaining back reflections. FIG. 5 shows the angled facets provided at the ends of the SOI waveguide 1 either side of the gap 1A.

Figure 4:
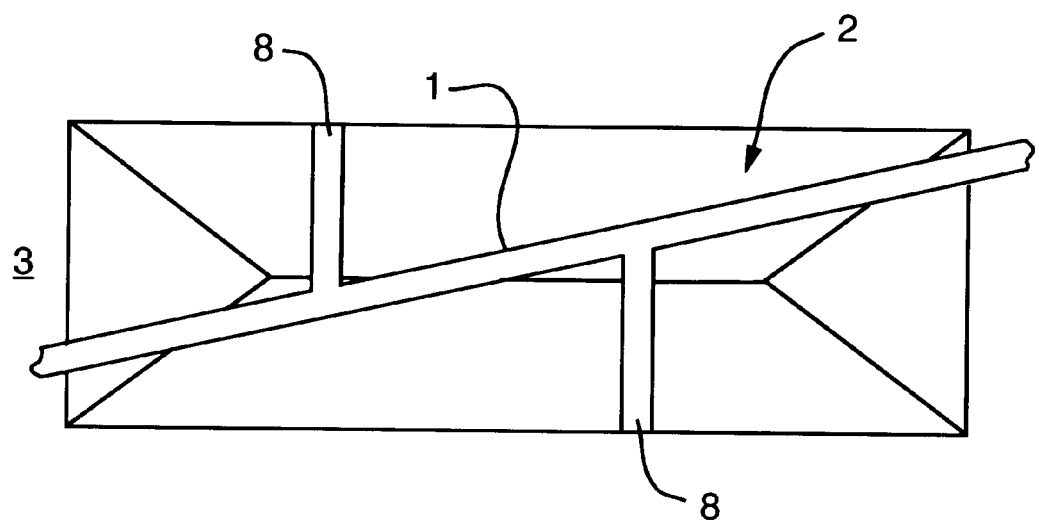
FIG. 4 is a similar view to FIG. 1 and shows a third embodiment of the device.

Depending on the length of the thermally isolated portion of silicon layer 4 extending across the recess 2, and the dimensions and hence strength thereof, it may be desirable to provide the suspended portion with localized support as the suspended portion crosses the recess 2. This may comprise beams 8 formed from the silicon layer 4 together with the underlying oxide layer extending out from the sides of the V-groove to help support the suspended portion as shown in FIG. 4. Other forms of support which increase the strength of the thermally isolated portion of the waveguide without significantly compromising its thermal isolation may also be used.

The SOI chip described above is particularly suited to forming a suspended portion of a silicon layer as the oxide layer underlying the silicon layer serves to protect the silicon layer from being attacked by the etchant used to form the recess. The use of an anisotropic etchant such as CsOH or KOH which etches silicon much faster than it etches silicon dioxide can thus be used to form the structure illustrated.

It will be appreciated that other forms of recess may be used, the V-groove just being an example which is particularly easy to form. As illustrated in FIG. 1, the SOI waveguide 1 preferably extends obliquely across the V-groove since if the SOI waveguide 1 extended parallel to the V-groove, the etching process would tend to form two parallel V-grooves on either side of the SOI waveguide 1 rather than etching beneath the SOI waveguide 1. The recess need only be of a size sufficient to provide the required thermal isolation of the SOI waveguide 1.

The ability to thermally stabilize a waveguide and/or control the temperature of the waveguide and therefore properties such as refractive index of the waveguide has potential use in a wide variety of applications, e.g. as a tuneable arm of an interferometer, tuneable gratings, in switches, tuneable filters etc, and particularly in applications requiring tuning over a timescale of a few milliseconds and, as mentioned above, this can be achieved using currents only in the order of milliamps.

Although the embodiment described above relates to the thermal isolation and temperature control of a waveguide extending across a recess, a similar structure may be used to thermally stabilize and/or control the temperature of other integrated optical components or devices. A device may, for instance, be supported or formed on a silicon bridge or projection analogous to that described above, or a plurality of components or a section of an integrated circuit may likewise be provided or formed on such a structure to thermally isolate it from the surrounding structures and/or adjacent devices. In each case, the bridge or projection comprises a portion of the silicon layer (together with the underlying oxide layer) which extends across or over a recess in the substrate. Any form of integrated optical component, device or circuit which can be formed in a silicon layer, and which can be fitted onto such a suspended portion, may likewise be formed thereon.

The present invention has been described in detail for the purpose of illustration. It is understood that such detail is solely for that purpose, and variations can be made therein by those skilled in the art without departing from the scope of the invention as disclosed.

We claim:

1. An integrated optical circuit formed in a silicon layer and supported on a substrate, a portion of the silicon layer being substantially thermally isolated from the substrate by extending over a recess in the substrate and temperature control means being provided to control the temperature of the portion of the silicon layer or of a device provided thereon.

2. An integrated optical circuit as claimed in claim 1, where the temperature control means comprises a metallic layer which may be heated by passing a current therethrough.

3. An integrated optical circuit as claimed in claim 1, where temperature sensing means are provided for monitoring the temperature of the portion of the silicon layer.

4. An integrated optical circuit as claimed in claim 3, where the temperature sensing means comprises a pn junction formed on the portion of the silicon layer.

5. An integrated optical circuit as claimed in claim 1, where the portion of the silicon layer is provided with a thermal expansion gap to accommodate differential thermal expansion of the portion of the silicon layer relative to the substrate.

6. An integrated optical circuit as claimed in claim 5, where the portion of the silicon layer further comprises at least one end and the gap is provided proximate to an end of the portion of the silicon layer.

7. An integrated optical circuit as claimed in claim 5, where the portion of the silicon layer further comprises angled facets on each side of the gap to reduce back-reflections therefrom.

8. An integrated optical circuit as claimed in claim 5, where the portion of the silicon layer further comprises at least one end, where the at least one end of the portion of the silicon layer comprises an anti-reflective coating on at least one side of the gap.

9. An integrated optical circuit as claimed in claim 1, provided with at least one support for supporting the portion of the silicon layer as the portion of the silicon layer extends over the recess, where the recess further comprises at least one edge.

10. An integrated optical circuit as claimed in claim 9, where the support comprises a beam extending from an edge of the recess to the portion of the silicon layer.

11. An integrated optical circuit as claimed in claim 1, where an integrated waveguide, formed in the silicon layer, is provided on the portion of the silicon layer.

12. An integrated optical circuit as claimed in claim 11, where the waveguide comprises a silicon rib waveguide.

13. An integrated-optical circuit as claimed in claim 11, where the portion of the silicon layer is provided with a thermal expansion gap to accommodate differential thermal expansion of the portion of the silicon layer relative to the substrate, and where the waveguide further comprises angled facets on each side of the gap to reduce back-reflections therefrom.

14. An integrated optical circuit as claimed in claim 11, where the portion of the silicon layer is provided with a thermal expansion gap to accommodate differential thermal expansion of the portion of the silicon layer relative to the substrate, where the waveguide further comprises at least one end, and where at least one end of the waveguide further comprises an anti-reflective coating on at least one side of the gap.

15. An integrated optical circuit as claimed in claim 1, where the portion of the silicon layer has a length in the range of about 50 to 1000 microns.

16. An integrated optical circuit as claimed in claim 1, where the portion of the silicon layer has a width of up to about 40 microns and a thickness of up to about 14 microns.

17. An integrated optical circuit as claimed in claim 1, where the recess comprises a V-groove.

18. An integrated optical circuit as claimed in claim 1, formed from a silicon-on-insulator chip.

19. An integrated optical circuit formed in a silicon layer and supported on a substrate, a portion of the silicon layer being substantially thermally isolated from the substrate by extending over a recess in the substrate and a temperature controller comprising conductive tracks formed by doped regions in the portion of the silicon layer to control the temperature of the portion of the silicon layer.

* * * * *